UNITED STATES PATENT OFFICE.

CHARLES ANTOINE HEUDEBERT, OF NANTERRE, FRANCE.

MANUFACTURE OF A CONCENTRATED BREAD.

1,293,772.   Specification of Letters Patent.   Patented Feb. 11, 1919.

No Drawing.   Application filed October 25, 1916.   Serial No. 127,579.

*To all whom it may concern:*

Be it known that I, CHARLES ANTOINE HEUDEBERT, a citizen of the French Republic, and residing at No. 85 Rue Saint-Germain, in Nanterre, Seine, France, have invented certain new and useful Improvements in the Manufacture of Concentrated Bread, of which the following is a specification.

This invention has for its object to provide an improved concentrated bread intended for use in place of ordinary bread when there is a scarcity of the latter and when it is impossible to manufacture or procure ordinary bread.

Under such circumstances there are already in use biscuits known as "ships' biscuits," "army biscuits," &c., of various kinds, but the various processes proposed hitherto have only the result of manufacturing imperfect products as regards the appearance, constitution and digestibility of the same.

The greater number of such products have really consisted of a compact mass of unleavened dough more or less baked and dried and having a strongly compressed and impervious outer surface. Such products which have a hard consistency are difficult to masticate and they break up only incompletely when they come in contact with a liquid, so that it is difficult for the saliva and the gastric juices to penetrate them. The products are therefore insufficiently digested and badly assimilated so that they produce intestinal fermentations and, in many cases, diarrhea and intestinal troubles which are well known by the army doctors under the name of "biscuit diarrhea."

The present invention has now for its object to provide an improved concentrated bread which is a biscuit of leavened dough that is easily permeated by liquids, is readily penetrated by the saliva and the digestive juices and is consequently capable of being completely digested and assimilated, and further, is not attended by any of the above-stated drawbacks.

This improved biscuit made of leavened dough is produced by a peculiar process which has been designed with the objects:

(*a*) Of effecting in the flour to be converted into biscuit a uniform distribution of a leaven or yeast that is already working;

(*b*) Of causing this yeast to work under special conditions in such a maner as to effect a fine and regular distribution of the cavities in the interior of the dough; and (*c*) Of arresting the fermentation by a suitable method of baking, without causing the dough to fall again from its risen condition.

The improved process of manufacture of this concentrated bread is as follows:—

1. 500 grams of "grain" yeast are broken up in a vessel containing 32 liters of slightly tepid water, and in it this yeast is completely dissolved (mixed) while allowing it to foam. Then 30 kilograms of flour are poured, in about three portions, into the mixture, care being taken to mix the mass well so as to form a very uniform and very firm and thick dough without any lumps. This semi-fluid paste thus produced constitutes the "stock." This "stock" is left for about an hour. It is ready for use when, after having risen, its surface assumes a convex shape and forms "eyes." This dough must not be allowed to fall again.

2. This "stock" is poured into a kneading device with the remainder of the 100 kgs. of flour. This operation must be effected very rapidly. The kneading device is then set in motion and 1 kg. of salt is added which has been previously dissolved in about 3 liters of water. The kneading operation is continued for about 10 to 20 minutes according to the type of kneading device employed. The dough thus produced must be very uniform, be slightly hard and resistant to the hand. In the course of this kneading operation the cuttings or waste portions from the biscuit-making apparatus must be introduced into the kneading device in small quantities as soon as the kneading operation has begun.

3. The dough is removed from the kneading device and placed on the dough carriages. After having milled this dough it is cut into strips of the length of the plates of the rolling apparatus, then the dough is again milled so that it can be easily fed into the biscuit-making machine, which cuts and forms the dough into square cakes. These cakes are then placed upon sheet metal plates that may be perforated or not, with a space of about 2 centimeters between them.

This third operation as described allows of utilizing the existing army appliances although in industrial installations it may be effected by different means.

4. The plates thus charged with the cakes are then placed into the plate carriages which are closed so as to keep the cakes in a confined atmosphere. These carriages may be closed either by means of sliding doors or simply by means of cloths nailed to the upper part of the carriages so as to fall freely down, or by any other means. These carriages are placed in a warm room which may be dimly lighted, but preferably is completely darkened, heated to a temperature of about 30 to 40° centigrade. The atmosphere of this room must not be dry and it is kept moist to a determined degree by any suitable means depending on the method of heating which is employed. Thus, for example, when the room is heated by radiators a slight escape of steam may be allowed to take place into the room, or if the room is heated by a furnace or stove, sprinkling must be frequently effected in the room.

This fourth operation has the object, before the cakes of dough are placed in the oven, of producing a modified form of bread fermentation which is necessary for producing the desired texture or consistency of the product.

The duration of this fermentation may be varied according to the temperature and the conditions under which it takes place; it may last for three-quarters of an hour to one-and-a-half hours. After this fermentation the cakes should have increased to twice their volume and a slight exudation should be observed on their surface.

5. The cakes are then placed in the oven which may be of any suitable type and be heated either with coal or with wood. The temperature of the oven should be 200 to 225° C. Preferably, the oven is provided with a spraying or steaming device for the purpose of imparting a better appearance to the products. The baking operation takes 35 to 40 minutes.

6. On leaving the oven the biscuits are placed in boxes with special precautions to avoid their being exposed to the risk of coming in contact with a current of cold air. When the boxes are full they are covered with sacks so that the biscuits will cool slowly. This operation, during which the biscuits have "reëxuded", lasts 24 hours. The biscuits are then left in the open boxes or placed on driers where they remain for three or four days according to the season, after which they can then be packed in cases for sending away.

In the improved process, on the one hand, the regular distribution of yeast in working in the flour to be converted into biscuit and on the other hand the bread fermentation before the cakes of dough are placed in the oven, have the result of producing a biscuit of leavened dough having an inside texture of fine and regular holes.

Owing to its peculiar constitution the improved product is readily permeated by liquids; by being merely plunged in water it will take up a sufficient quantity of water to allow of its being masticated and digested without causing any digestive troubles; nevertheless, it is non-hygroscopic and can be kept without change for a number of years; it is further sufficiently friable to be able to be crunched by the teeth without previous preparation.

The improved product may be used as bread in substitution for fresh bread and also as bread for soup.

It is to be understood that any suitable devices and appliances may be employed for carrying out the improved process of this invention.

Having now described my invention, what I claim as new and desire to secure by Letters Patent is:—

1. A process for the manufacture of a biscuit of hard raised dough, which comprises the following operations:—incorporating the flour into an emulsion of active yeast in water, in such proportions as to produce a firm dough or "sponge", while avoiding the presence therein of lumps, subjecting this dough to a first fermentation, adding to this fermented dough a further quantity of flour the weight of which is about double that of the flour used for the preparation of the sponge, the total amount of flour being such as to produce a hard dough containing only about 24% of water, kneading this hard dough, adding salt at any stage not later than the final kneading, rolling out the same into sheets and dividing into biscuits, subjecting these biscuits to a supplementary fermentation under such conditions that this fermentation will substantially completely use up the yeast and that at the end thereof the dough will have a finely porous structure and will no longer be capable of rising under the influence of the expansion of the gases caused by heating, introducing these biscuits into the oven and baking at a temperature of about 200 to 225° C., cooling the biscuits thus obtained while out of contact with air drafts and finally drying said biscuits.

2. The process for the manufacture of a biscuit of hard raised dough, which comprises the steps of incorporating the flour into an emulsion of active yeast in water, for the purpose of preparing a stiff dough or "sponge", subjecting this dough to a first fermentation for about an hour, until the same rises and "eyes" form, adding to this fermented dough a further quantity of flour the weight of which is about twice that of the flour used for the preparation of the sponge the total amount of flour being sufficient to produce a hard dough containing only about 24% of water, kneading this hard dough, adding salt at any stage of the process not later than the final kneading, rolling the same into a sheet having a thickness of less than two cm., cutting the same into biscuits, subjecting these biscuits to a supplementary fermentation, while protected from light and in a moist and confined atmosphere at a temperature of from 30 to 40° C., for a period of time which may vary from three quarters of an hour to an hour and a half, the length of time, the conditions of temperature and of moisture varying according to atmospheric conditions, and this supplementary fermentation being sufficient to exhaust the action of the yeast so that at the termination thereof the dough will be of a finely porous structure and will not be capable of rising through the expansion of the contained gases by heat during the subsequent baking, introducing these biscuits into the oven and baking them at a temperature of about 200 to 225° C., cooling the biscuits thus obtained in a confined chamber, finally drying them.

3. As a new product of manufacture, a raised cracker bread containing only a small percentage of water and made from flour, yeast, water and salt by successive additions of flour and fermentation and subsequent baking, said cracker bread having a finely porous regular grain and a substantially homogeneous crusty texture throughout the same, not having expanded in baking, said cracker bread being capable, when immersed in water, of absorbing a large amount of water without disintegration, substantially as described.

In testimony whereof I have signed my name to this specification in the presence of two subscribing witnesses.

CHARLES ANTOINE HEUDEBERT.

Witnesses:
CHAS. P. PRESSLY,
FRANÇOIS WEBER.

Copies of this patent may be obtained for five cents each, by addressing the "Commissioner of Patents, Washington, D. C."